US009939996B2

(12) United States Patent
Beavers et al.

(10) Patent No.: US 9,939,996 B2
(45) Date of Patent: Apr. 10, 2018

(54) SMART SCRUBBER IN AN EBOOK NAVIGATION INTERFACE

(71) Applicant: Google Inc., Mountain View, CA (US)

(72) Inventors: Adeline Lee Beavers, Mountain View, CA (US); Marco Paglia, San Francisco, CA (US); Nathan Stuart Streu, San Francisco, CA (US); Chorong Johnston, Mountain View, CA (US); Brian Armstrong, San Francisco, CA (US)

(73) Assignee: Google LLC, Mountain View, CA (US)

( * ) Notice: Subject to any disclaimer, the term of this patent is extended or adjusted under 35 U.S.C. 154(b) by 282 days.

(21) Appl. No.: 14/459,193

(22) Filed: Aug. 13, 2014

(65) Prior Publication Data

US 2016/0048275 A1 Feb. 18, 2016

(51) Int. Cl.
*G06F 3/0484* (2013.01)
*G06F 3/0483* (2013.01)
(Continued)

(52) U.S. Cl.
CPC .......... *G06F 3/0483* (2013.01); *G06F 3/0485* (2013.01); *G06F 3/04847* (2013.01);
(Continued)

(58) Field of Classification Search
USPC ........................................................ 715/234
See application file for complete search history.

(56) References Cited

U.S. PATENT DOCUMENTS 8,555,195 B2   10/2013  Piersol et al.
9,141,257 B1 *  9/2015  Goldstein ............... G06F 3/167
(Continued)

FOREIGN PATENT DOCUMENTS

WO   WO 2014/120383 A1   8/2014

OTHER PUBLICATIONS

Jose Bidarra, Designing eBook Interaction for Mobile and Contextual Learning, 2014, IEEE, Technologies and Learning, pp. 1-5.*
(Continued)

*Primary Examiner* — Frank D Mills
*Assistant Examiner* — Ahmad M El-Bkaily
(74) *Attorney, Agent, or Firm* — Shumaker & Sieffert, P.A.

(57) ABSTRACT

An ebook is represented as ebook pages associated with locations. An interface for navigating the ebook pages includes a smart scrubber. Positions on the smart scrubber correspond to locations of ebook pages. The smart scrubber includes contextual icons that represent contextual information associated with a location in the ebook. To generate the scrubber, contextual information is obtained and selected for display based on selection criteria. Contextual icons representing the selected contextual information are placed on the smart scrubber in positions corresponding to their associated locations. A navigation command directed at a position on the smart scrubber (or a contextual icon at that position) results in display of the ebook page at the location corresponding to that position. One example contextual icon is a page restore thumbnail representing the last page read, which is selected for display when the smart scrubber is used to navigate away from the last page read.

14 Claims, 9 Drawing Sheets

(51) Int. Cl.
*G06F 17/30* (2006.01)
*G06F 3/0485* (2013.01)
*G06F 3/0488* (2013.01)

(52) U.S. Cl.
CPC ...... *G06F 3/04855* (2013.01); *G06F 3/04883* (2013.01); *G06F 17/30011* (2013.01); *G06F 2203/04806* (2013.01); *G06F 2203/04808* (2013.01)

(56) References Cited

U.S. PATENT DOCUMENTS

| | | | | |
|---|---|---|---|---|
| 2003/0052900 | A1* | 3/2003 | Card | G06F 3/04815 345/660 |
| 2012/0162115 | A1 | 6/2012 | Lim | |
| 2012/0204099 | A1 | 8/2012 | Yamada | |
| 2013/0080881 | A1* | 3/2013 | Goodspeed | G06F 17/21 715/251 |
| 2014/0068428 | A1 | 3/2014 | Puppin | |
| 2014/0201681 | A1* | 7/2014 | Mahaffey | H04M 1/72569 715/846 |
| 2014/0297742 | A1* | 10/2014 | Lyren | H04L 65/403 709/204 |
| 2015/0177933 | A1* | 6/2015 | Cueto | G06F 3/0483 715/776 |
| 2015/0213547 | A1* | 7/2015 | Gomez-Rosado | G06F 3/04817 705/27.2 |
| 2015/0247737 | A1* | 9/2015 | van Dok | G01C 21/3691 701/431 |
| 2015/0277678 | A1* | 10/2015 | Wu | G06F 3/0483 715/776 |

OTHER PUBLICATIONS

PCT International Search Report and Written Opinion for PCT/US2015/044722, dated Nov. 24, 2015, 9 Pages.
"Reading Basics," Amazon.com, [online] [Retrieved on May 26, 2014] Retrieved from the Internet <URL: http://www.amazon.com/gp/help/customer/display.html?nodeId=201304710#GUID-0D02DE0C-FFB6-434F-92E7-35981FAD9B63/>, 1 page.
"Your Kindle Means Nothing," Jules Just Write, 2013, 8 Pages, [online] [Retrieved on May 26, 2014] Retrieved from the Internet <URL:http://julesjustwrite.com/tag/kindle/>.
YouTube.com, [Retrieved on May 26, 2014] <URL:www.youtube.com>, 1 page.

* cited by examiner

SMART SCRUBBER IN AN EBOOK NAVIGATION INTERFACE

BACKGROUND

Field of Disclosure

This disclosure relates to the field of displaying information via a graphical user interface, and specifically to generating navigation interfaces that facilitate navigation of ebooks.

Description of Related Art

Digital devices present readable digital content such as novels, news articles, and short stories as well as digital content such as videos and pictures. Current interfaces for navigating ebooks provide for linear navigation and for coarse navigation. These interfaces are adequate for reading novels but are less suitable for reading reference books such as textbooks or for reading collections of content such as cookbooks or magazines. For example, a user reading a section in a textbook consults a glossary but cannot conveniently return to the section the user was reading.

SUMMARY

The above and other needs are met by a computer-implemented method, a non-transitory computer-readable storage medium storing executable instructions, and a system for generating navigation interfaces that facilitate navigation of ebooks.

In one embodiment, a computer-implemented method generates a navigation interface that facilitates navigation of an ebook. The method comprises the following steps. A dynamic rendering of an ebook as a plurality of ebook pages is generated. A first ebook page of the plurality of the ebook pages is displayed. This first ebook page is associated with a first location. A plurality of contextual information associated with a plurality of locations is obtained. The plurality of locations is associated with a plurality of ebook pages. The plurality of contextual information supplements content of the ebook at the plurality of locations. Contextual information from the plurality of contextual information is selected based on selection criteria. The selected contextual information is associated with a second location in the ebook. A scrubber representing a range of pages within the ebook is generated. The scrubber comprises a contextual icon representing the selected contextual information and placed at a second position along the scrubber. The second position corresponds to the second location. The scrubber is displayed with the selected icon in an interface including a representation of the first ebook page.

In one embodiment, a non-transitory computer-readable storage medium stores executable instructions for generating a navigation interface that facilitates navigation of an ebook. The instructions are executable by a processor to perform the following steps. A dynamic rendering of an ebook as a plurality of ebook pages is generated. A first ebook page of the plurality of the ebook pages is displayed. This first ebook page is associated with a first location. A plurality of contextual information associated with a plurality of locations is obtained. The plurality of locations is associated with a plurality of ebook pages. The plurality of contextual information supplements content of the ebook at the plurality of locations. Contextual information from the plurality of contextual information is selected based on selection criteria. The selected contextual information is associated with a second location in the ebook. A scrubber representing a range of pages within the ebook is generated. The scrubber comprises a contextual icon representing the selected contextual information and placed at a second position along the scrubber. The second position corresponds to the second location. The scrubber is displayed with the selected icon in an interface including a representation of the first ebook page.

In one embodiment, a device generates a navigation interface that facilitates navigation of an ebook. The device comprises a processor configured to execute modules and a memory storing the modules. The modules comprise a parsing module, an icon selection module, and a navigation interface module. The parsing module is configured to generate a dynamic rendering of the ebook as a plurality of ebook pages. The icon selection module is configured to obtain a plurality of contextual information associated with a plurality of locations in the ebook. Each location associated with an ebook page of the plurality of ebook pages. The plurality of contextual information supplements content of the ebook at the plurality of locations. The icon selection module is further configured to select contextual information from the plurality of contextual information. The selected contextual information is associated with a second location in the ebook. The navigation interface module is configured to display a first ebook page of the plurality of ebook pages. The first ebook page is associated with a first location in the ebook. The navigation interface module is further configured to generate a scrubber representing a range of pages within the ebook. The scrubber comprises a contextual icon representing the selected contextual information. The contextual icon is placed at a second position along the scrubber. The second position corresponds to the second location. The navigation interface module is further configured to display the scrubber with the contextual icon in an interface comprising the first ebook page.

In one embodiment, the device further comprises a command detection module configured to receive a navigation command directed at a third position associated with the scrubber, to determine a distance between the third position and the second position, and to perform an action associated with the contextual icon responsive to a comparison of the distance to a distance threshold.

In one embodiment, the device further comprises a an icon generation module configured to select a type of contextual icon based on a type of the selected contextual information, and to generate the contextual icon representing the selected contextual information by customizing a visual appearance of the selected type of contextual icon to reflect the contextual information.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
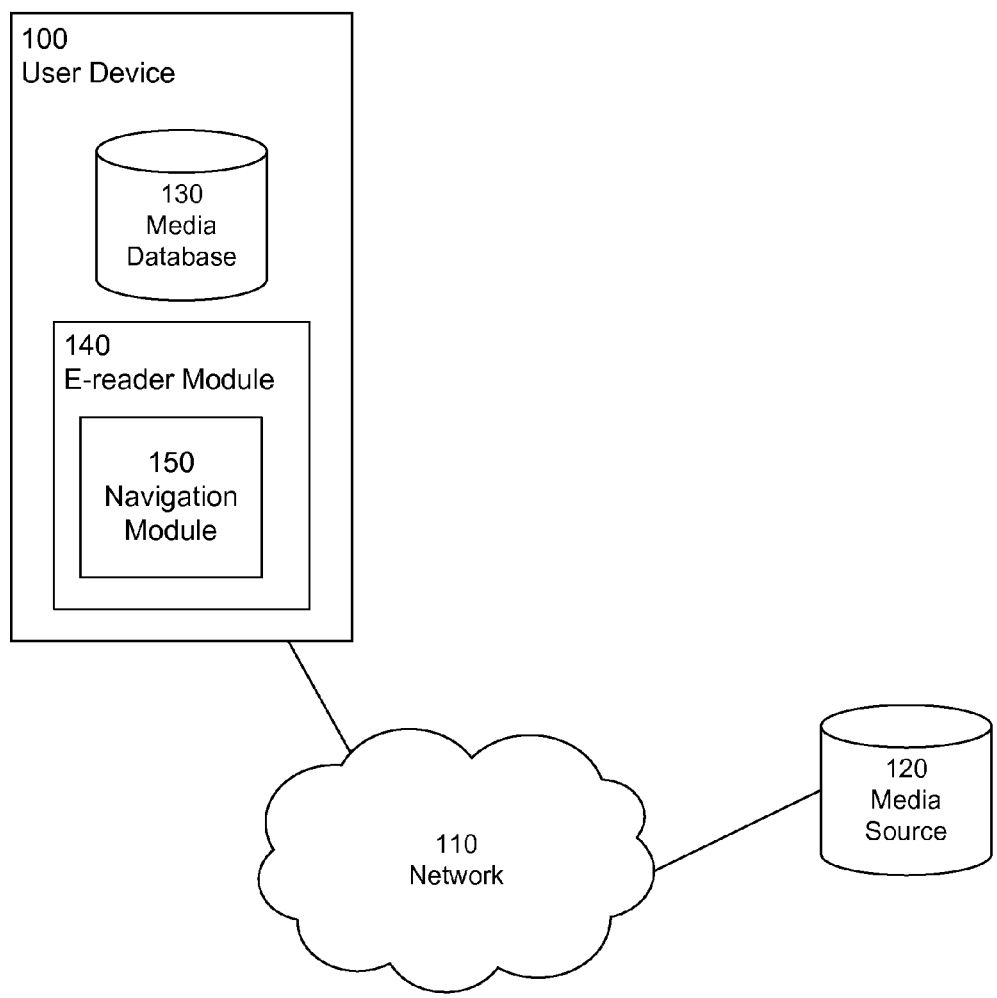
FIG. 1 is a high-level block diagram illustrating an embodiment of an environment for generating navigation interfaces that facilitate navigation of ebooks.

FIG. 1 is a high-level block diagram illustrating an embodiment of an environment for generating navigation interfaces that facilitate navigation of ebooks. The environment includes a user device 100 connected by a network 110 to a media source 120. Here one user device 100 and one media source 120 are illustrated but there may be multiple instances of each of these entities. For example, there may be thousands or millions of user devices 100 in communication with multiple media sources 120.

The network 110 provides a communication infrastructure between the user device 100 and the media source 120. The network 110 is typically the Internet, but may be any wired or wireless network, including but not limited to a Local Area Network (LAN), a Wide Area Network (WAN), a mobile network, a private network, or a virtual private network. The media source 120 includes one or more computer servers that provide ebooks to the user devices 100. The media source 120 may be, for example, an ebook retailer, a library, etc. The media source 120 may directly provide an ebook to the user devices 100 via the network 110.

An ebook is an electronic book that includes content and metadata. The ebook content includes an electronic collection of text (and possibly non-text content such as images, animations, sound, and/or video). For example, the ebook content includes the content of a book as it would be printed on the pages of a traditional paper-based book. All of the text in the collection may be from a single source, or the collection may contain text from different sources. The text may originate from a traditional paper-based format (e.g., a physical book or newspaper), or from a digital format (e.g., electronic files in a format such as Portable Document Format (PDF), electronic publication (EPUB) format, or flowing text format).

A portion of an ebook is a basic grouping of content within an ebook. A portion (e.g., a word, a sentence, non-text content) of an ebook is associated with a location, which indicates the sequential ordering of that portion relative to other portions of the ebook. Portions of an ebook are aggregated into segments, which divide the ebook into groupings of related portions. A segment may be, for example, a chapter, a subsection of a chapter, an index, a map, a recipe, a bibliography, an article, a glossary, or some combination thereof. For example, an ebook can include one segment for each chapter of the ebook and a segment for the index.

The ebook metadata includes bibliographical information about the ebook, such as the ebook identifier, title, author, publication date, edition/version number, number of pages, number of chapters, a segment listing, page thumbnails for ebook pages, or some combination thereof.

The user device 100 is a computing device that executes computer program modules (e.g., a web browser or other client application) that allow a user to view ebooks, newsfeeds, browse the Internet, and generally consume digital content. A user device 100 might be, for example, a personal computer, a tablet computer, a smart phone, a laptop computer, a dedicated e-reader, or other type of network-capable device such as a networked television or set-top box.

A user device 100 comprises a media database 130 and an e-reader module 140 in one embodiment. In one embodiment these entities are software application modules executing on the user device 100. For example, the modules 130 and 140 are integrated into a smart phone application executing on a smart phone.

The media database 130 stores information relating to ebooks. Information relating to ebooks includes ebooks, associated metadata, and annotations. Annotations may be, for example, bookmarks, comments, or highlighted portions of text. Annotations are associated with one or more portions of text and a particular user that created the annotation. The media database 130 includes annotations created by the user of the user device 100 and/or by other users (e.g., contacts, social network connections of the user). An annotation may include formatting metadata (e.g., a color, an icon) that the e-reader module 140 uses to display the annotation.

The e-reader module 140 generates a reading interface that presents an ebook to a user. For example, the reading interface is a graphical user interface (GUI) that displays portions of the ebook rendered as an ebook page based on display characteristics of the user device (e.g., screen size, display resolution) and e-reader settings (e.g., font size, zoom level). An ebook page is associated with the locations corresponding to the portions on the ebook on that ebook page. The "location associated with an ebook page" refers to one of these locations. An example reading interface is discussed below with respect to FIG. 2.

The e-reader module 140 includes a navigation module 150 that processes navigation commands received from the user. A navigation command is a command that facilitates user navigation through an ebook. A navigation command allows a user, for example, to page forward and/or backward within the ebook, to generate a navigation interface in a particular navigation mode, to interact with the generated navigation interface (e.g., as described below with reference to FIGS. 3A and 3B), or to perform some other action.

In some embodiments, the navigation module 150 generates a navigation interface in response to receiving a navigation command from the user (e.g., via a gesture). A navigation interface is a GUI that enables a user to navigate to different ebook pages in a quick and/or non-linear fashion.

A navigation command may cause the navigation module 150 to toggle between the navigation interface and the reading interface. An example navigation interface is discussed below with respect to FIGS. 3A-3C.

The navigation module 150 generates a smart scrubber as part of the navigation interface. The smart scrubber graphically displays progress through the ebook. A given position on the smart scrubber corresponds to a location of a portion of the ebook. For example, the smart scrubber is a horizontal bar with a left end representing the first ebook page and a right end representing the last ebook page. As another example, the smart scrubber is a line with positions on the line representing different locations in the ebook. In response to navigation commands directed at the smart scrubber, the navigation module 150 displays another portion of the book without necessarily navigating linearly through the interspersed portions of the ebook.

The navigation module 150 may display contextual icons on the smart scrubber. A contextual icon represents contextual information associated with a location in the ebook. Contextual information supplements the content of a portion of the ebook and is associated with the location of that portion. A contextual icon representing contextual information is associated with the location of that contextual information. The position of a contextual icon on the scrubber corresponds to the location associated with the contextual icon. A contextual icon may indicate presence of contextual information such as an annotation (e.g., a bookmark, a highlight, a comment), the beginning of a segment (e.g., first ebook page of a chapter), or a user's progress (e.g., a current reading location, a farthest read location, a location at the beginning of the user's current reading session). Contextual icons may be associated with a user of the user device 100, another user of another reading device 100, or an aggregation of users. For example, a contextual icon indicates the location of popular highlights or bookmarks among users of the e-reader module 140. As another example, a contextual icon indicates a current reading location of a social network connection of the user.

In one embodiment, the navigation module 150 interprets navigation commands on the smart scrubber based on contextual icons proximate to the navigation command. For example, the navigation module 150 detects a navigation command directed toward a position on the scrubber near a displayed contextual icon denoting the beginning of a chapter. In response to the navigation command, the navigation module 150 displays the beginning of the chapter rather than the actual ebook page corresponding to the position of the navigation command.

In one embodiment, the navigation interface displays ebook pages as thumbnails. After a navigation command requesting a navigation interface is received, the navigation module 150 identifies ebook pages for thumbnail generation, and generates page thumbnails for the identified ebook pages. A page thumbnail is a selectable image of an ebook page which has been scaled down in size, and if selected causes the e-reader module 140 to display the ebook page associated with the page thumbnail in the reading interface. In one embodiment, the navigation module 150 generates a page restore thumbnail of the last page displayed in the reading interface. The page restore thumbnail is a contextual icon displayed on or adjacent to the smart scrubber at a position corresponding to the location of the last page read. By selecting the page restore thumbnail, a user may return to the last page read in the reading interface.

The navigation interface enables a user to easily and rapidly navigate to precise locations within an ebook. For example, the smart scrubber enables navigation to locations within the ebook in a non-linear manner, which may be helpful for users reading ebooks (e.g., cookbooks, travel books, text books, magazines) that are not normally read in a linear manner. Moreover, the page restore thumbnail enables a user to scroll through various book pages while retaining a one-touch control to return to the last ebook page displayed in the reading interface.

Alternatively or additionally to displaying the smart scrubber in the navigation interface, the e-reader module 140 displays the smart scrubber as part of a reading interface. For example, the smart scrubber is displayed at the bottom of the reading interface, or the smart scrubber is normally hidden but is displayed in the reading interface in response to detecting an input at the bottom of the screen.

When the disclosed system collects personal information about users, or makes use of personal information, the user may control whether programs or features collect user information (e.g., information about a user's social network, social actions or activities, a user's preferences, user's ebooks, a user's current location in an ebook). In addition, certain data may be treated in one or more ways before it is stored or used, so that personally identifiable information is removed. For example, a user's identity may be anonymized so that no personally identifiable information can be determined for the user. Thus, the user may have control over how information is collected about the user and used by the media source 120 or some other content server.

Reading Interface

Figure 2:
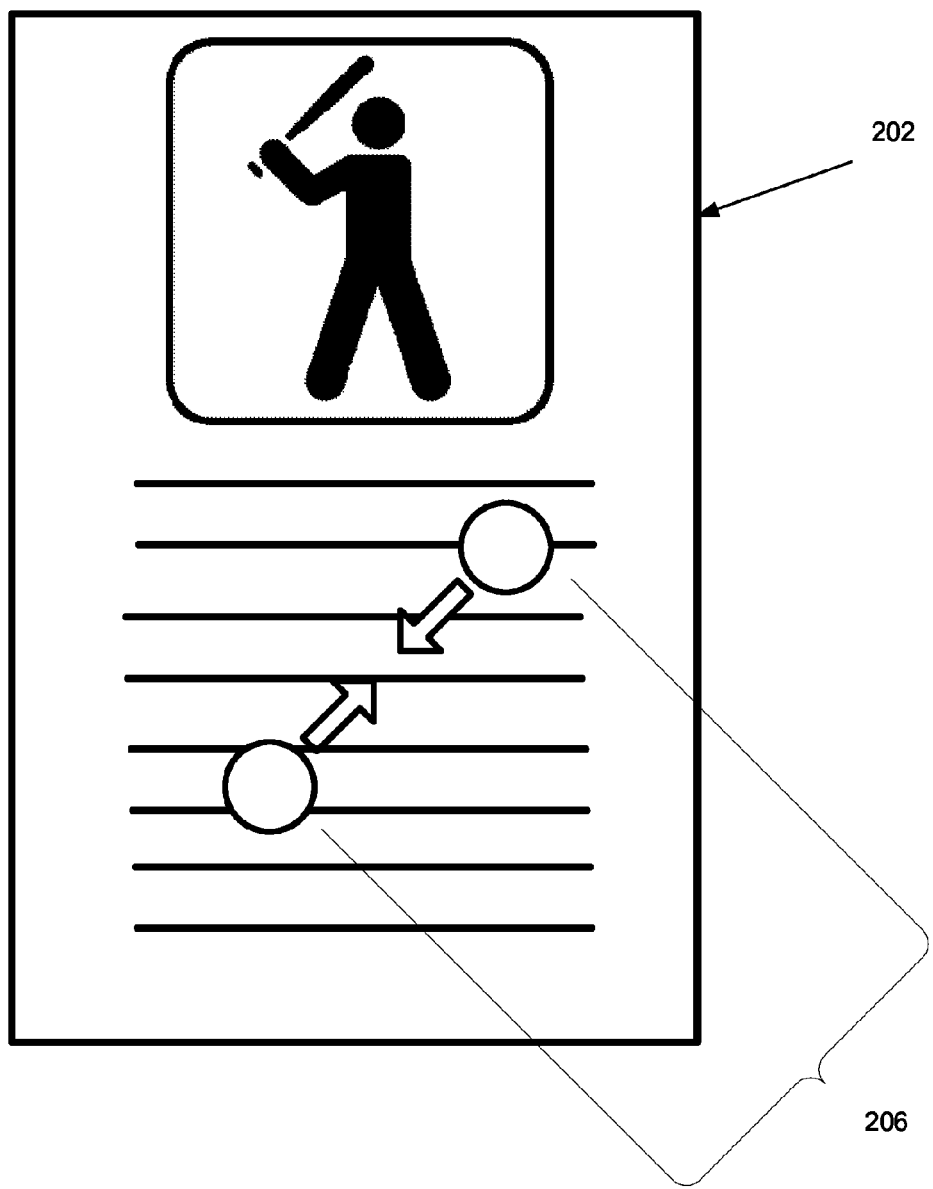
FIG. 2 illustrates an example reading interface showing an ebook page according to an embodiment.

FIG. 2 illustrates an example of a reading interface 200 displayed by a user device 100 showing an ebook page 202 according to an embodiment.

In one embodiment, a user may navigate through the ebook using gestures. Gestures are movements made by the user while contacting a touch-screen interface of the user device 100 that impart commands (e.g., a navigation command) to the user device 100. Gestures include a swiping gesture, a tapping gesture, a pinching gesture, a stretching gesture, or some combination thereof. Alternatively or additionally, a navigation command may also be provided to the user device 100 via a selectable thumbnail, a menu dropdown, a physical button on the user device 100, another selection means, or a combination thereof.

A swiping gesture is received when a portion of the touch-screen interface is touched and the touched portion is then dragged in a particular direction. For example, a user pages backward in the ebook by swiping horizontally from left to right across the ebook page 202. Likewise, a user pages forward in the ebook by swiping horizontally from right to left across the ebook page 202.

A tapping gesture is received when a single portion on the touch-screen interface is touched for a short duration of time (e.g., less than half a second). A tapping gesture 204 received by the reading interface 200 is indicates a request for a navigation interface in the intermediate navigation mode.

A pinching gesture or a stretching gesture is received when two locations on the touch-screen interface are touched and a distance between the two locations then changes. A reference distance value is a value associated with the original distance between two locations originally touched on a touch-screen interface. An active distance value is a value associated with the current distance between two touched locations. A pinching gesture typically refers to a gesture where the active distance value decreases relative to the reference distance value. A stretching gesture refers to a gesture where the active distance value increases relative to the reference distance value.

In FIG. 2, the pinching gesture 206 is a pinching gesture where a user is pinching inward such that the distance between the two locations on the ebook page 202 is shrinking In one embodiment, if the active distance of the pinching gesture (relative to the reference distance) is less than a threshold value, then the pinching gesture toggles from the reading interface 200 to a navigation interface. In one embodiment, as the active distance decreases, the size of the displayed ebook page 202 also decreases, and once the active distance value is less than the threshold value the reading interface 200 seamlessly transitions (e.g., zooms out) to a navigation interface, as shown in FIGS. 3A and 3B.

Navigation Interface

Figure 3A:
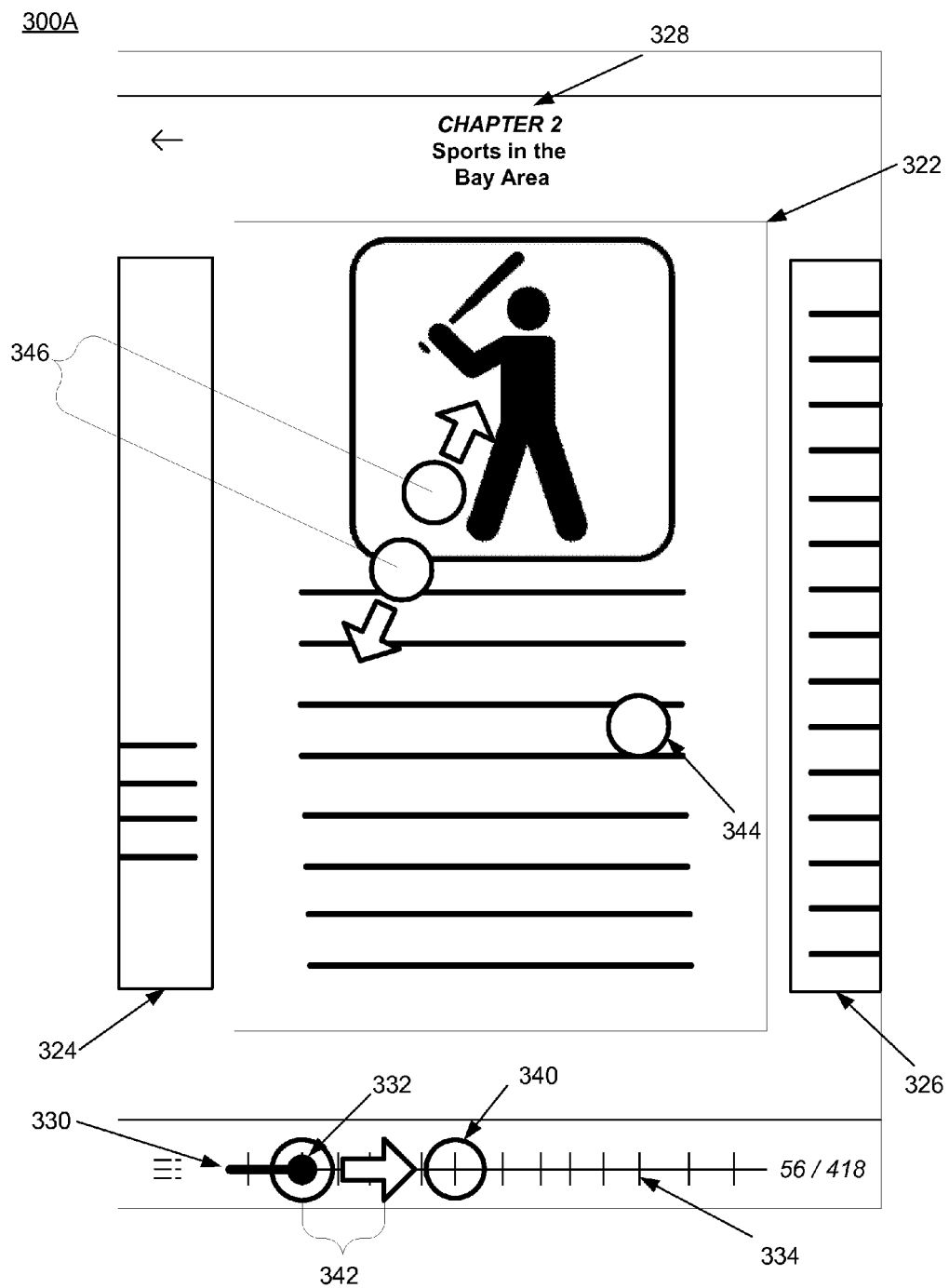
FIGS. 3A and 3B illustrate an example navigation interface including a smart scrubber according to an embodiment.
Figure 3B:
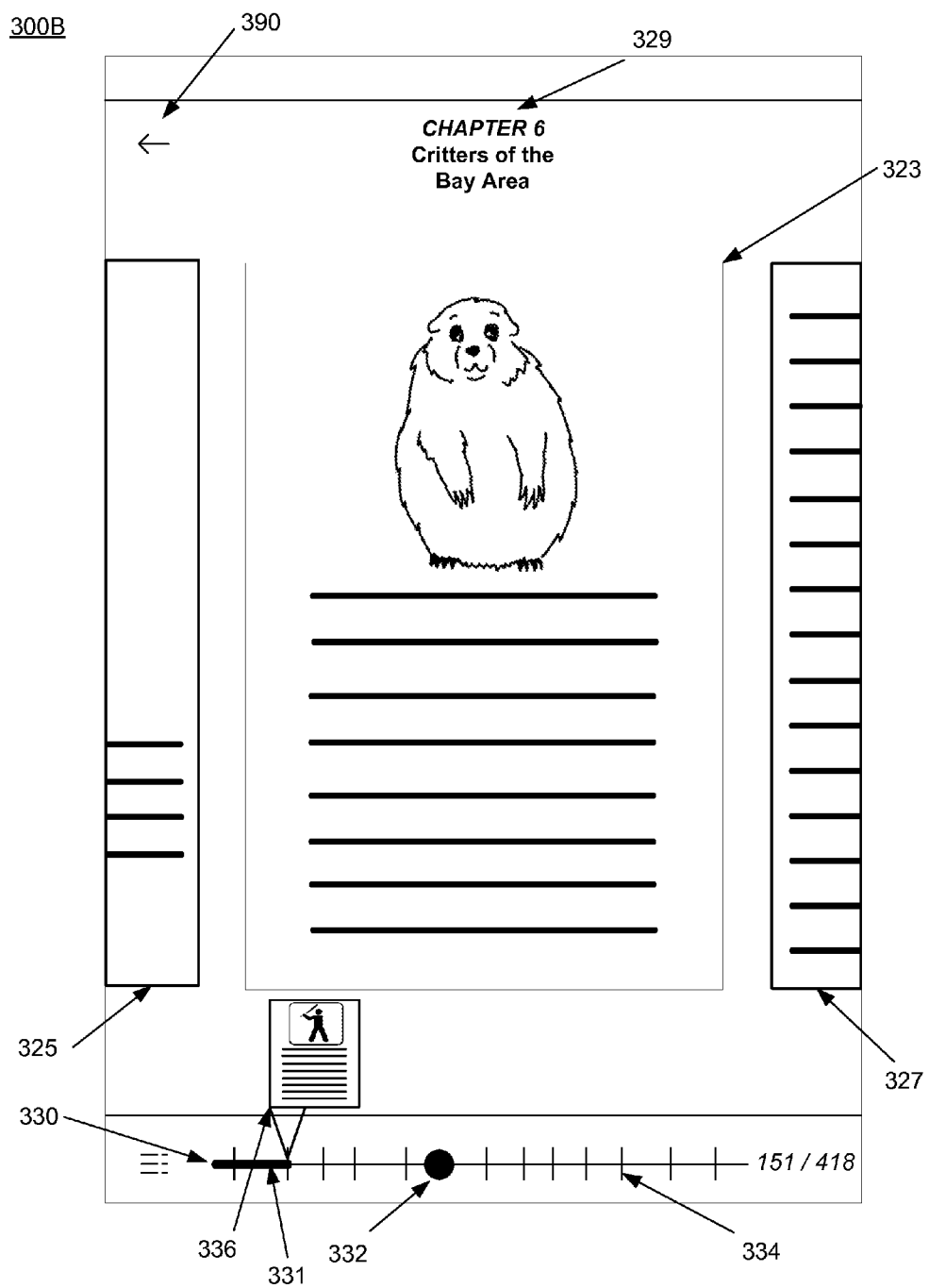

FIGS. 3A and 3B illustrate an example navigation interface 300 including a smart scrubber according to an embodiment. FIG. 3A illustrates an example navigation interface 300A displayed prior to receiving a navigation command, and FIG. 3B illustrates the example navigation interface 300B after receiving the navigation command.

Referring to FIG. 3A, the navigation interface 300A displays page thumbnails 322, 324, and 326. A page thumbnail is a smaller version of an ebook page associated with the page thumbnail. For example, the page thumbnail 322 is a smaller version of the ebook page 202. In one embodiment, the page thumbnail is scaled as a proportional reproduction of the ebook page; hence, the content of the page thumbnail matches the content of its corresponding ebook page.

In this example, page thumbnail 322 corresponds to the ebook page 202, the page thumbnail 324 corresponds to the prior ebook page, and the page thumbnail 326 corresponds to the next ebook page. In this embodiment, the page thumbnail 322 is emphasized (e.g., enlarged) relative to other page thumbnails to indicate that the user page thumbnail 322 represents the last ebook page displayed in the reading interface (i.e., the "last page read"). Additionally, the navigation interface 300A includes a segment area 328 that displays segment information associated with the displayed page thumbnail (e.g., page thumbnail 322 is associated with Chapter 2).

A user may interact with the navigation interface 300 with navigation commands such as gestures. For example, a user can rapidly page forward or backward in the ebook using a swiping gesture. Swiping horizontally from right to left across the navigation interface 300 causes display of ebook pages after of the ebook page 202. Likewise, swiping from left to right across the navigation interface 300 causes display of ebook pages before the ebook page 202. In some embodiments, the navigation module 150 pages through the ebook at a speed correlated to a speed of the swiping gesture.

In some embodiments, a tapping gesture on a page thumbnail indicates a request to display the ebook page associated with the page thumbnail. For example, a tapping gesture 344 on the page thumbnail 322 causes the user device 100 to display the ebook page 202, as shown in FIG. 2. Alternatively or additionally, a stretching gesture indicates a request to toggle to a reading interface displaying the ebook page corresponding to the page thumbnail displayed in the navigation interface. For example, a stretching gesture 346 causes the user device 100 to display the ebook page 202 in the reading interface 200, as shown in FIG. 2.

In some embodiments, a user may increase or decrease the size of displayed thumbnails using stretching gestures or pinching gestures, respectively. The navigation module 150 modifies the size of displayed page thumbnails in response to changes in the active distance value from a pinching or stretching gesture. Additionally, in some embodiments, if the user makes a stretching gesture where the active distance value exceeds an expansion threshold value (e.g., 30% greater than the reference distance), the navigation module 150 interprets the stretching gesture 346 as a request for the reading interface 200, as shown in FIG. 2. Thus, a user may effectively zoom into or out of a particular ebook page by pinching outward.

The navigation interface 300 includes a smart scrubber 330 that allows a user to quickly navigate the ebook. The smart scrubber 330 includes segment indicators 334, each of which is a contextual icon with a position on the scrubber indicating the location of the first page in a segment (e.g., first ebook page in a chapter). In the illustrated example, the positions on the smart scrubber 330 from left to right correspond to progressively later portions of the ebook. Hence, the segment indicators 334 from left to right correspond to progressively later segments of the ebook.

The smart scrubber 330 includes a location indicator 332, which is a contextual icon with a position indicating the last page read. For example, the position of the location indicator 332 corresponds to the location of the page thumbnail 322. Alternatively, the position of the location indicator 332 corresponds to the location of the last ebook page reached through linear reading. For example, a user periodically consults a character summary at the end of a novel before returning to linear reading through the novel. In this case, the location indicator 332 corresponds to the location of the last page read linearly rather than the location of the character index.

By directing an input toward the smart scrubber 330, a user may navigate to a page thumbnail without viewing thumbnails corresponding to interspersed ebook pages. The navigation module 150 interprets a tapping gesture on the smart scrubber 330 as a command to navigate to the location of the ebook corresponding to the position on the smart scrubber 330. For example, the tapping gesture 340 results in the navigation interface 300 displaying the page thumbnail corresponding to the position of the tapping gesture 340.

Alternatively or additionally, the user may interact with the smart scrubber 330 via a swiping gesture 332. While a user swipes, the navigation module 150 tracks the position of contact with the smart scrubber 330 and navigates to the location corresponding to the position on the smart scrubber 330. Once the swiping gesture is complete (e.g., there is no longer contact with the touch-screen interface), the navigation module 150 remains at the location corresponding to the last position of contact with the touch-screen interface. For example, the user interacts with the smart scrubber 330 via a swiping gesture 342. The swiping gesture 342 begins by contacting a position on the smart scrubber 330 (in this case, the position of the location indicator 332) and then sliding toward a final position of contact with the smart scrubber 330. The navigation interface 300 then displays the page thumbnail corresponding to the final position of contact.

In one embodiment, the navigation module 150 modifies a navigation command on the smart scrubber 330 based on a nearby contextual icon. The navigation module 150 interprets the navigation command as if it were directed at the nearby contextual icon. In response, the navigation module 150 performs an action associated with the nearby contextual icon. For example, the navigation module 150 receives a gesture (e.g., tapping gesture 340, the swiping gesture 342) near segment indicator 334. In response, the navigation module 150 displays the ebook page associated with the segment indicator 334.

In one embodiment, the navigation module 150 determines whether to modify a navigation command by comparing positions of the navigation command and the nearby contextual icon. For example, the navigation module 150 determines if a position of the navigation command is within a threshold distance (e.g., distance along the scrubber) of the position of the nearby contextual icon. If the distance between the positions is less than the threshold distance, then the navigation module 150 treats the navigation command as if it were directed toward the displayed contextual icon. For example, the navigation module 150 displays the page at the location associated with the contextual icon. Alternatively to comparing positions, the navigation module 150 compares locations associated with the position of the navigation command and the position of the contextual icon.

FIG. 3B illustrates the example navigation interface 300B after receiving a navigation command (such as the tapping gesture 340 or the swiping gesture 342). In this example, the page thumbnail 323 depicts the ebook page at the location corresponding to the position of the navigation command. The page thumbnails 325 and 327, respectively, correspond to the ebook pages before and after the ebook page corresponding to the page thumbnail 323. The segment area 329 indicates that the displayed page thumbnail 323 is associated with Chapter 6.

The smart scrubber 330 reflects the changed location of the currently displayed page thumbnail 323. The navigation interface 300B displays the current location icon 332 at a position corresponding to the location of the ebook page depicted in the page thumbnail 323. Additionally, the smart scrubber 330 includes a progress bar 331 that reflects the location of the last page read in the reading interface 200. For example, the position of the progress bar's right end corresponds to the location of the last page read.

In one embodiment, the navigation module 300B displays a page restore thumbnail 336 at a position on the smart scrubber 330 corresponding to the location of the page last read in the reading interface 200. The navigation module 150 generates and displays the page restore thumbnail 336 when the location of the page corresponding to the displayed page thumbnail differs from the location of the last page read. If the navigation module 150 detects a navigation command selecting the page restore thumbnail 336, the e-reader module 140 displays the last page read in the reading interface 200. Alternatively, selection of the page restore thumbnail 336 causes the navigation module 150 to display the page thumbnail corresponding to the last page read.

The page restore thumbnail 336 is a contextual icon dynamically generated based on a particular page. In one embodiment, the page restore thumbnail is generated based on the content of the last read page. For example, the page restore thumbnail 336 is a miniature page thumbnail corresponding to the page thumbnail 322 displayed before the navigation command was received (e.g., via the tapping gesture 340, via the swiping gesture 342). Other dynamically generated page restore thumbnails 336 present segment information (e.g., chapter name in a novel, section number in a textbook), representative page content (e.g., an image from the ebook page, a representative sentence), or other associated content (e.g., an annotation from the ebook page, supplemental content from the ebook publisher). Dynamically rendering the page restore thumbnail 336 from the content of the corresponding ebook page advantageously reminds the user of the corresponding ebook page.

The page restore thumbnail 336 may also be a generic icon that is visually consistent regardless of the content of the last page read. For example, the page restore thumbnail 336 is a straight arrow pointing leftwards or an arrow curled into a circular shape and directed counterclockwise.

In touch-screen implementations of the user device 100, the page restore thumbnail 336 beneficially provides a relatively large spatial affordance on the display to receive gestures. In other words, the page restore thumbnail 336 provides a "tap target" for navigation commands to return to the last page read. Hence, one implementation of the navigation interface 300 displays the page restore thumbnail 336 larger than other contextual icons on the smart scrubber 330.

In one embodiment, the page restore thumbnail 336 marks the last page read while the user navigates the ebook using the navigation interface 300. The navigation module 150 removes the page restore thumbnail 336 from the smart scrubber 330 when a command is received to toggle to the reading interface 200. Upon re-entering the navigation interface 300, the page restore thumbnail is no longer present.

In an alternative embodiment, the navigation module 150 removes the page restore thumbnail 336 from visual display but stores the location of the page restore thumbnail upon displaying a page in the reading interface 200. Upon re-entering the navigation interface 300, the smart scrubber 330 again includes the page restore thumbnail 336 corresponding to the stored location. In this embodiment, the navigation module 150 removes the page restore thumbnail 336 from the smart scrubber 330 after a number of page turns in the reading interface 200 equals or exceeds a threshold number of page turns.

Alternatively or additionally to displaying the page restore thumbnail 336, the navigation interface 300 includes a return icon 390 that causes the user device 100 to display the last page read in the reading interface 200 (or the thumbnail corresponding to the last page read in the navigation interface 300).

Smart Scrubber

Figure 3C:
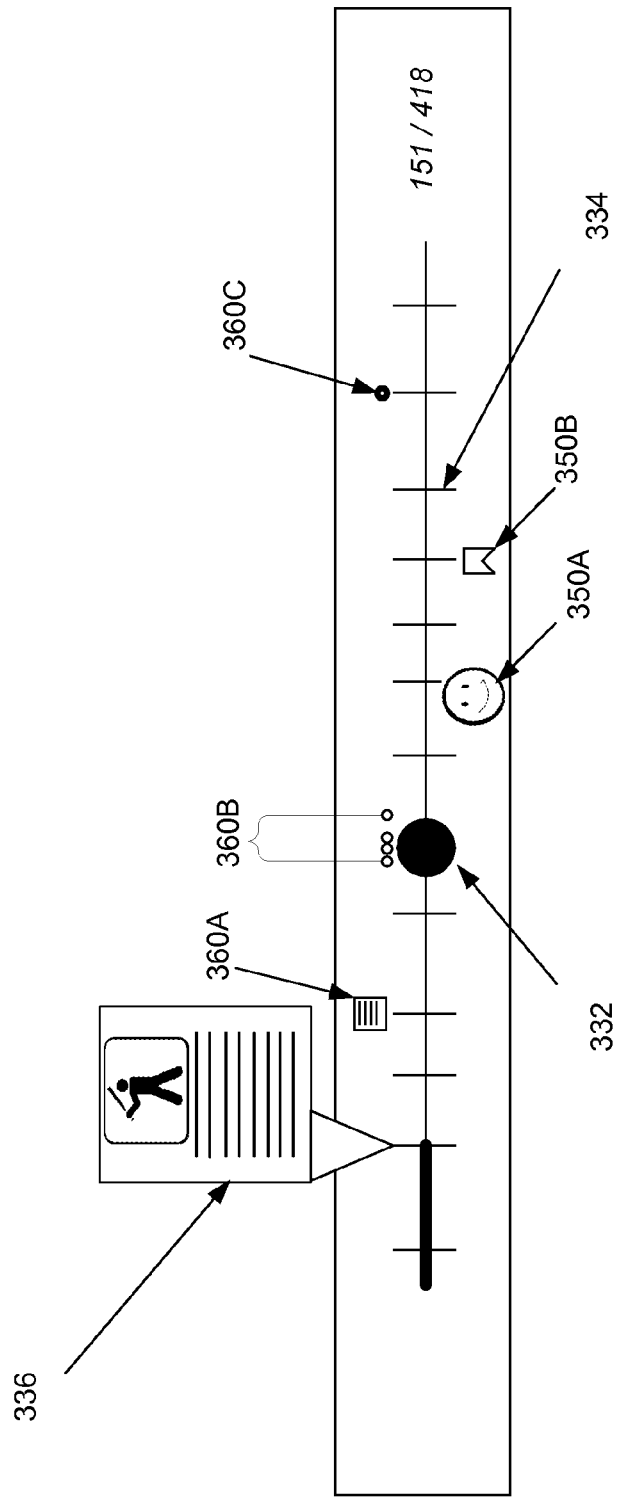
FIG. 3C illustrates a detailed view of the smart scrubber illustrated in FIGS. 3A and 3B according to an embodiment.

FIG. 3C illustrates a detailed view of the smart scrubber 330 illustrated in FIG. 3B, according to an embodiment. The smart scrubber 330 includes contextual icons including the location indicator 332, segment indicators 334, and the page restore thumbnail 336, which are described with respect to FIGS. 3A and 3B. Besides the aforementioned contextual icons, the smart scrubber 330 may include additional contextual icons.

Contextual icons may include annotation icons and visual indicators. Annotation icons represent annotations and have positions on the smart scrubber 330 corresponding to the locations of the represented annotations. Example annotation icons represent comments, highlights, or bookmarks and may have been created by a user of the user device or by another user. For example, annotation icon 360A represents a highlight created by another user, and annotation icons 360B and 360C represent comments annotated by the user. For example, the annotation icons 360B and 360C correspond to annotations received from another user of an electronic book club that the user has joined (e.g., via a social network).

Visual indicators indicate both transient and non-transient contextual information associated with a location in an electronic book. Non-transient contextual information reflects the structure of the ebook (e.g., the segment indicators 334). Transient contextual information includes current reading locations (e.g., the location indicator 332), previous reading locations (e.g., the page restore thumbnail 336), and other user's reading locations. For example, visual indicator 350A indicates a current reading location of a social network contact and visual indicator 350B represents the farthest reading location of another user of the user device 100.

Similar to the page restore thumbnail 336, contextual icons may be dynamically generated based on context or may be static, generic icons. For example, a dynamically generated contextual icon associated with another user, such as visual indicator 350A, has an avatar image and/or color corresponding to that user. A dynamically generated contextual icon may reflect the location of the contextual icon (e.g., a page number, a segment title, a segment number), content of the ebook at the location (e.g., a sentence from that page, an image from that page, a page thumbnail), or content of an associated annotation. A static or generic icon does not vary with the corresponding location or user. For example, static or generic icons have a characteristic color or shape that indicates the type of contextual icon (e.g., type of annotation, type of visual indicator).

In the illustrated embodiment, different types of contextual icons are displayed in different areas of the smart scrubber 330. For example, the annotation icons 360A-360C are displayed in the upper half of the smart scrubber 330, and the visual indicators 350A and 350B are displayed in the lower half of the smart scrubber 330. Other arrangements are possible; for example, the navigation interface 300 displays contextual icons corresponding to the user of the user device 100 in the upper half of the smart scrubber 330 and contextual icons corresponding to other users in the lower half of the smart scrubber 330. As another example, the navigation interface 300 displays contextual icons to minimize visual crowding rather than visually separating the contextual icons into different types of contextual icons.

In one embodiment, the navigation interface 300 clusters contextual icons having similar locations and hence proximate positions on the smart scrubber 330. The navigation interface 300 may display one of the clustered contextual icons as a representative of the cluster. In the illustrated embodiment, the contextual icon 360C represents a group of clustered contextual icons having a similar type or position. or the navigation interface 300 may display an indicator of clustered contextual icons (e.g., contextual icon 360C). In one embodiment, the navigation module 150 uses the current location of the currently displayed page to determine whether to display clustered contextual icons separately (e.g., contextual icons 360B) or as a representative contextual icon (e.g., contextual icon 360C). For example, if the position of the location indicator 332 is within a threshold horizontal distance of the position of the clustered contextual icons, then the navigation interface 300 displays them separately. Alternatively or additionally, the navigation module 150 detects gestures selecting clustered contextual icons and then displays the clustered icons separately in response. For example, the navigation interface 300 responds to a tapping gesture on a representative contextual icon by separately displaying the clustered contextual icons.

Navigation Module

Figure 4:
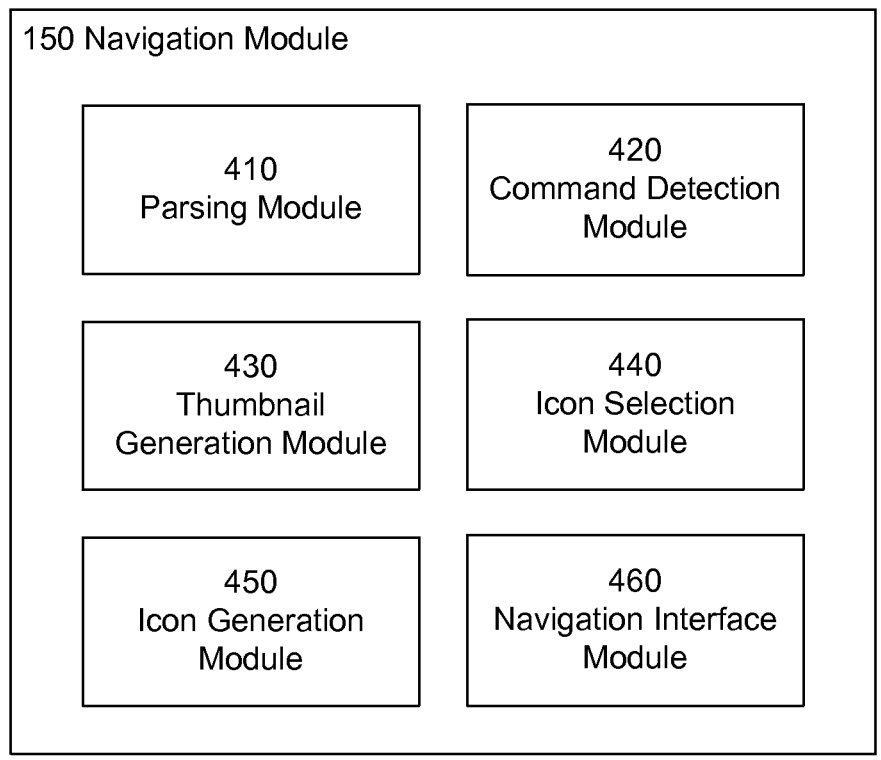
FIG. 4 is a high-level block diagram illustrating a detailed view of modules within a navigation module of a user device according to an embodiment.

FIG. 4 is a high-level block diagram illustrating a detailed view of modules within the navigation module 150 of a user device 100 according to an embodiment. Some embodiments of the navigation module 150 have different modules than those described here. Similarly, the functions can be distributed among the modules in a different manner than is described here. The navigation module 150 includes a parsing module 410, a command detection module 420, a thumbnail generation module 430, an icon selection module 440, an icon generation module 450, and a navigation interface module 460.

The parsing module 410 represents an ebook as ebook pages, each of which is associated with one or more segments. The parsing module 410 parses portions of the ebook into ebook pages based on locations of the portions. The parsing module 410 varies the amount of ebook content on an ebook page based in part on the display area available to present ebook content, the font size, and/or other factors. FIG. 2 illustrates a single ebook page provided by the parsing module 410. The parsing module 410 provides one or more of such ebook pages to the e-reader module 140 for presentation to the user.

The command detection module 420 detects navigation commands from a user to the user device 100. As discussed with respect to FIGS. 2 and 3A, navigation commands may be received via gestures on a touch-screen interface, selection of menu items, or physical buttons on the user device 100, for example. The command detection module 420 determines whether the navigation command is intended to toggle between a reading interface and a navigation interface, to navigate to another location in the ebook, to create an annotation, or to perform another function. For example, the command detection module 420 determines that a tapping gesture on a smart scrubber is a request to navigate to another location corresponding to the tapping gesture's position on the smart scrubber. The command detection module 420 may include a mapping between positions on the smart scrubber and corresponding locations in the ebook. The command detection module 420 provides the navigation command to the navigation interface module 460 and/or other modules.

The thumbnail generation module 430 generates page thumbnails in accordance with the requested type of navigation mode. Generation of a page thumbnail refers to creation of a page thumbnail from an ebook page and/or retrieving a page thumbnail from the media database 130 and/or the media source 120. In one embodiment, the thumbnail generation module 430 renders page thumbnails by scaling down ebook pages retrieved from the media database 130. The thumbnail generation module 430 renders a page thumbnail and stores the page thumbnail in the media database 130 for later use by the navigation interface module 460. Alternatively or additionally, the thumbnail generation module 430 renders page thumbnails in real-time in response to navigation commands or other changes to the navigation interface module 460 (e.g., a font size change, creation of an annotation). The icon selection module 440 and/or navigation interface module 460 use page thumbnails from the thumbnail generation module 430.

The icon selection module 440 selects contextual information associated with the ebook for display as contextual icons in association with the smart scrubber. The icon selection module 440 may select contextual information based on selection criteria such as e-reader state, user preferences, social context of e-reader usage, available display space on the smart scrubber, and capabilities of the user device 100. E-reader state refers to the condition of the e-reader module 140 given current values of program variables in the e-reader module 140 (e.g., current reading location, last read page) as well as recent inputs. User preferences refer to configurable options to customize the e-reader module 140 for a user. Social context refers to relationships between an e-reader user and other e-reader users that determine which contextual information is pertinent to the e-reader user. User device capabilities are characteristics of the user device's hardware components that affect display of and navigation through an e-book.

In one embodiment, the icon selection module 440 identifies eligible contextual information by applying filtering criteria to the contextual information to remove ineligible contextual information. The filtering criteria filter out (i.e., remove) contextual information that is not relevant to the user. For example, the last page read is filtered if the current reading location differs from the last read page by less than a threshold number of e-book pages. As another example, the selection module 440 filters contextual information that contravenes a user's display preferences or that conflicts with the social context for reading an e-book.

In one embodiment, the icon selection module 440 ranks contextual information (e.g., eligible contextual information as determined by filters) according to the selection criteria. Ranking the eligible contextual information may include scoring the contextual information according to a linear combination of the selection criteria and then ranking the eligible contextual information by those scores. For example, the selection module 440 assigns score values to selection criteria that match an instance of contextual information and then sums the score values to determine a score for the instance of contextual information. Alternatively or additionally to scoring the contextual information, the icon selection module 440 assigns categories to instances of contextual information (e.g., always select, frequently select, sometimes select, rarely select) based on selection criteria. For example, the current reading location and the locations of segment first pages are assigned to an "always select" category. The selection module 440 may rank contextual information within assigned categories by assigning scores.

In one embodiment, the icon selection module 440 selects contextual information from eligible contextual information that passed through the filtering based on a ranking and/or scoring of the eligible contextual information. Selecting contextual information may include determining a limit on the number instances of contextual information selected for display (e.g., based on display area, other device capabilities). Selecting contextual information may include determining a threshold ranking or a threshold score. The icon selection module 440 selects those instances of contextual information having a ranking better than or equal to the threshold ranking or a score better than or equal the threshold score.

The icon selection module 440 may select contextual information based at least in part on the e-reader state. The filtering criteria may incorporate conditions based on the e-reader state. For example, the icon selection module 440 selects the last read page for display as a page restore thumbnail based on a comparison between the current reading location and the last read page. As another example, the icon selection module 440 selects contextual information for display in response to an input directed at a position on the smart scrubber corresponding to the location of the selected contextual information. The icon selection module 440 may rank or score contextual information based on e-reader state. For example, contextual information at a location similar to the current location receives a higher rank or score.

In one embodiment, the icon selection module 440 determines whether to display contextual information for display as separate contextual icons or as a clustered contextual icon based on an e-reader state such as a current reading location, a recently received navigation command, or other selection criteria. For example, the icon selection module 440 determines that a position of clustered contextual icons on the scrubber is within a threshold horizontal distance or the current location indicator; in response, the icon selection module 440 selects the contextual information corresponding to the clustered contextual icons for display as separate contextual icons. Conversely, if the position of densely spaced contextual icons is greater than a threshold distance from the position of the location indicator, the icon selection module 440 selects a representative instance of the set of contextual information for display as a contextual icon representing the set of densely spaced contextual icons. As another example, the icon selection module 440 selects contextual information for display as separate contextual icons in response to a navigation command (e.g., a tapping gesture, a swiping gesture, a mouse over) directed at the clustered contextual icons.

The icon selection module 440 may select contextual information based at least in part on user preferences. User preferences may be received from explicit selections by a user or may be inferred from user interaction with the e-reader module 140. User preferences may be used as conditions for filtering criteria. For example, if the user preferences indicate that the e-reader module 140 should hide comments from other users, then the icon selection module 440 selects contextual information associated with the user of the e-reader module 140 rather than contextual information associated with other users. User preferences may be used to determine a number of instances of contextual information to select. For example, a user's preferences indicate whether the user prefers to see a low, a medium, or a high number of contextual icons.

The icon selection module 440 may select contextual information based at least in part on social context. Different social contexts alter the relevance of different contextual information. For example, the icon selection module 440 filters annotations authored by users other than users in the book club (e.g., users who have joined a social networking group representing a book club). As another example, in a live classroom social context, the icon selection module 440 ranks annotations authored by a teacher user as well as a current reading location of the teaching user above other contextual information. In an example solo reading social context, the icon selection module 440 assigns higher scores for popular annotations when a user is reading alone than when the user is reading in a book club or in a classroom setting.

The icon selection module 440 may select contextual information for display based at least in part on available display space or other user device capabilities. User device capabilities include display device size, display device resolution, available processing power, available memory, or input device characteristics. For example, the icon selection module 440 determines the number of instances of contextual information selected for display based on the display area allocated to the smart scrubber. As another example, the icon selection module 440 assigns higher scores to contextual information stored in a more responsive memory (e.g., a cache, Random Access Memory, flash memory) than contextual information stored in a less responsive memory (e.g., a hard disc, a memory external to the user device 100) to improve responsiveness of the e-reader module 140. When the input device is a touchscreen, the icon selection module 440 assigns higher scores to contextual icons that have a larger display size to improve spatial affordance to receive gestures.

In one embodiment, the icon selection module 440 selects contextual information based on estimated display positions of contextual icons corresponding to the contextual information. The icon selection module 440 estimates display positions for contextual icons representing the contextual information based on locations associated with the contextual information. The icon selection module 440 then determines whether an instance of contextual information has a contextual icon with an estimated display position that conflicts with an estimated display position of another contextual icon representing a higher ranked instance of contextual information. Responsive to determining that the contextual icon representing the instance of contextual information's display position does not conflict with display positions of contextual icons representing contextual information ranked above the instance of contextual information, the icon selection module selects the instance of contextual information. The display positions of contextual icons conflict when there is an overlap in the estimated display position, or there is less than a threshold distance between borders of the contextual icons. For example, the page restore thumbnail ranks above annotation icons created on the user device 100. In this example, if an annotation by a user and the page restore thumbnail have conflicting estimated display positions, then the icon selection module 440 selects the page restore thumbnail for display on the smart scrubber.

The icon generation module 450 generates contextual icons for display on or adjacent to a smart scrubber. In one embodiment, the icon generation module 450 generates contextual icons representing contextual information selected by the icon selection module 440. To create a contextual icon, the icon generation module 450 selects a type of contextual icon corresponding to the type of the contextual information. Examples of types of contextual icons include a vertical bar for a segment indicator, a filled circle for a location indicator, a ring for a comment, and a star for highlighted text.

For dynamically generated contextual icons, the icon generation module 450 may further customize the visual appearance of the selected type of icon to reflect the represented contextual information (e.g., based on allocation or user associated with the contextual information). The icon generation module 450 may incorporates a user-specific item (e.g., a profile image, a personal avatar image, an arbitrarily selected image, text, a user name, a characteristic color or arbitrarily assigned color) image into contextual icons associated with that user. As another example, the icon generation module 450 incorporates ebook content related to the location of the contextual information into a contextual icon (e.g., the page restore thumbnail).

The navigation interface module 460 generates a navigation interface including a smart scrubber using the contextual icons selected for display. In one embodiment, the navigation interface includes page thumbnails representing a page at a current location and adjacent pages, as shown in FIGS. 3A and 3B. The navigation interface also includes the smart scrubber and the contextual icons selected for display, as shown in FIG. 3C. The navigation interface module 460 modifies the navigation interface in response to navigation commands received from the command detection module 420. For example, the navigation interface module 460 toggles between the navigation interface and a reading interface or reacts to a user paging to another location in the ebook.

Smart Scrubber Generation

Figure 5:
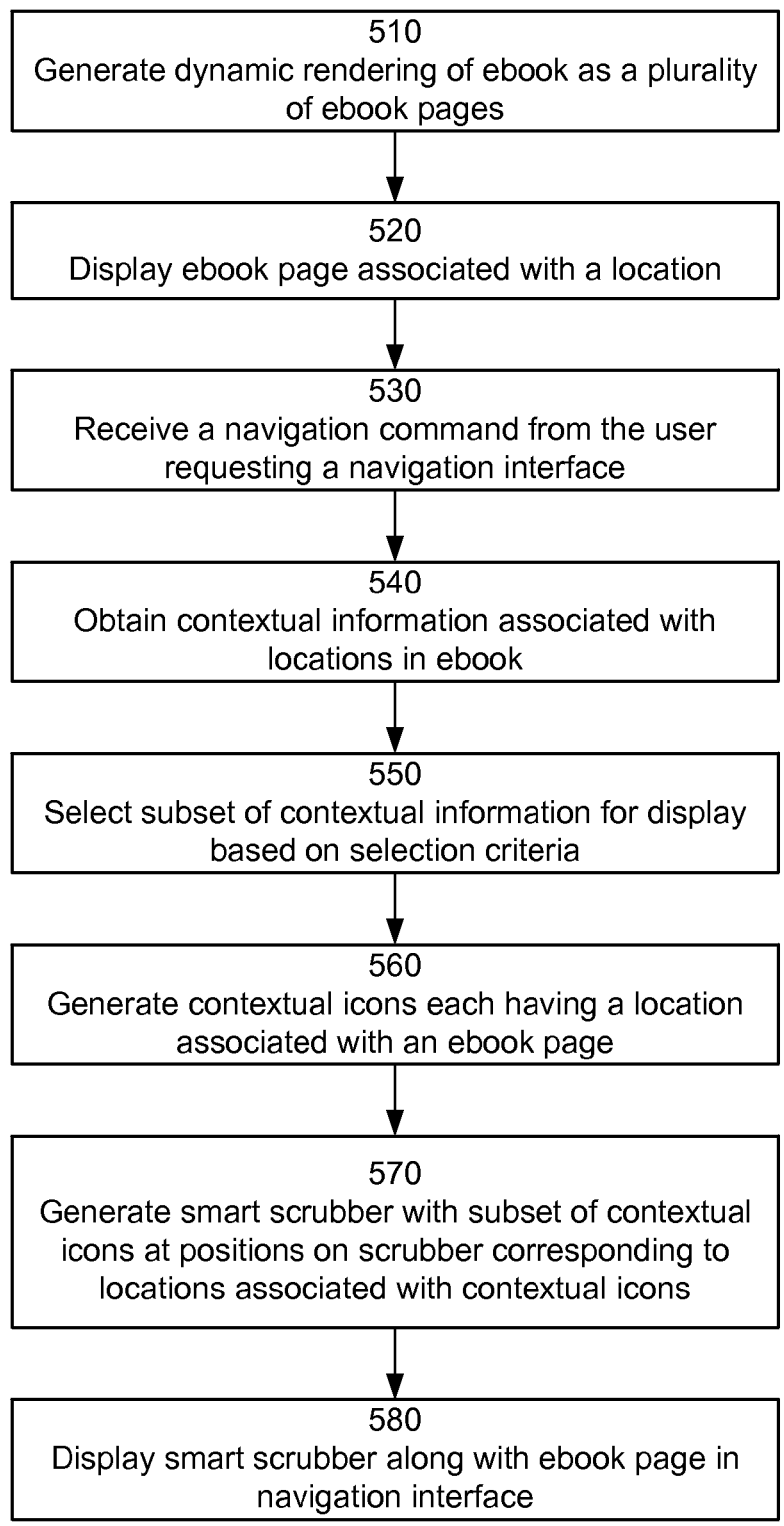
FIG. 5 is a flowchart illustrating a process of generating a navigation interface including a smart scrubber according to an embodiment.

FIG. 5 is a flowchart illustrating a process of generating a navigation interface including a smart scrubber according to an embodiment. Other entities may perform some or all of the steps of the process in other embodiments. Likewise, embodiments may include different and/or additional steps, or perform the steps in different orders.

The user device 100 generates 510 (e.g., using the parsing module 410) a dynamic rendering of an ebook as a plurality of ebook pages, which may be associated with a plurality of segments. The user device 100 parses the ebook into ebook pages for presentation to the user.

The user device 100 displays 520 (e.g., using the navigation interface module 460) portions of the ebook to the user as an ebook page (e.g., in a reading interface). The ebook page is associated with a location of a portion (e.g., the first portion, the last portion) of the ebook rendered on that page.

The user device 100 receives 530 (e.g., using the command detection module 420) a navigation command requesting a navigation interface in a particular navigation mode. The navigation command may be received 530 from the user via, for example, a gesture, selection of a displayed button, a menu selection, or selection of a physical button on the user device 100. For example, a received pinching toggles from the reading interface to the navigation interface. In response to receiving the navigation command requesting the navigation interface, the user device 100 generates the navigation interface.

The user device 100 obtains 540 (e.g., using the icon selection module 440) contextual information associated with the locations of the ebook. An instance of contextual information supplements content of the ebook at the location associated with the instance of contextual information. The contextual information may be obtained 540 from the media database 130, the e-reader module 140, the media source 120, or another user device 100.

The user device 100 selects 550 (e.g., using the icon selection module 440) contextual information for display based on selection criteria including the state of the e-reader module 140, user preferences, social context of e-reader usage, available display area, and other device capabilities. In one embodiment, the user device 100 always selects 550 the current reading location for display as a location indicator contextual icon. The user device 100 may determine whether to select 550 the last page read for display as a page restore thumbnail based on a comparison between the current location and the location of the last page read, and/or based on a number of page turns in reading mode after navigating to another location using the smart scrubber. Selecting the contextual information may include determining a social context in which the ebook is presented and selecting the contextual information based on the determined social context.

The user device 100 generates 560 (e.g., using the icon generation module 450) contextual icons corresponding to the selected contextual information. The contextual icons represent the contextual information and are associated with the same location as the represented contextual information. Generating the contextual icon may include identifying a user associated with the contextual information and modifying the visual appearance of the contextual icon based on the user associated with the contextual information. Generating the contextual icon may also include obtaining ebook content from the ebook page associated with the contextual icon and incorporating the ebook content into the contextual icon. In one embodiment, the user device 100 generates 560 (e.g., using the thumbnail generation module 430) a page restore thumbnail associated with the location of the last page read. In one embodiment, the user device 100 generates 560 a location indicator that represents the location of a currently displayed ebook page. Alternatively to generating contextual icons corresponding to selected contextual information, the user device 100 generates 560 contextual icons representing all of the obtained contextual information.

The user device 100 generates 570 (e.g., using the navigation interface module 460) the smart scrubber with the generated contextual icons at positions on the smart scrubber corresponding to locations associated with the contextual icons. The smart scrubber may also include a location indicator at a position on the smart scrubber corresponding to the location of the currently displayed ebook page.

The user device 100 displays 580 (e.g., using the navigation interface module 460) the smart scrubber along with a page thumbnail of the current ebook page in the navigation interface. Alternatively or additionally, the user device 100 displays 580 the smart scrubber in the reading interface with a rendering of the current ebook page.

Page Restoration

Figure 6:
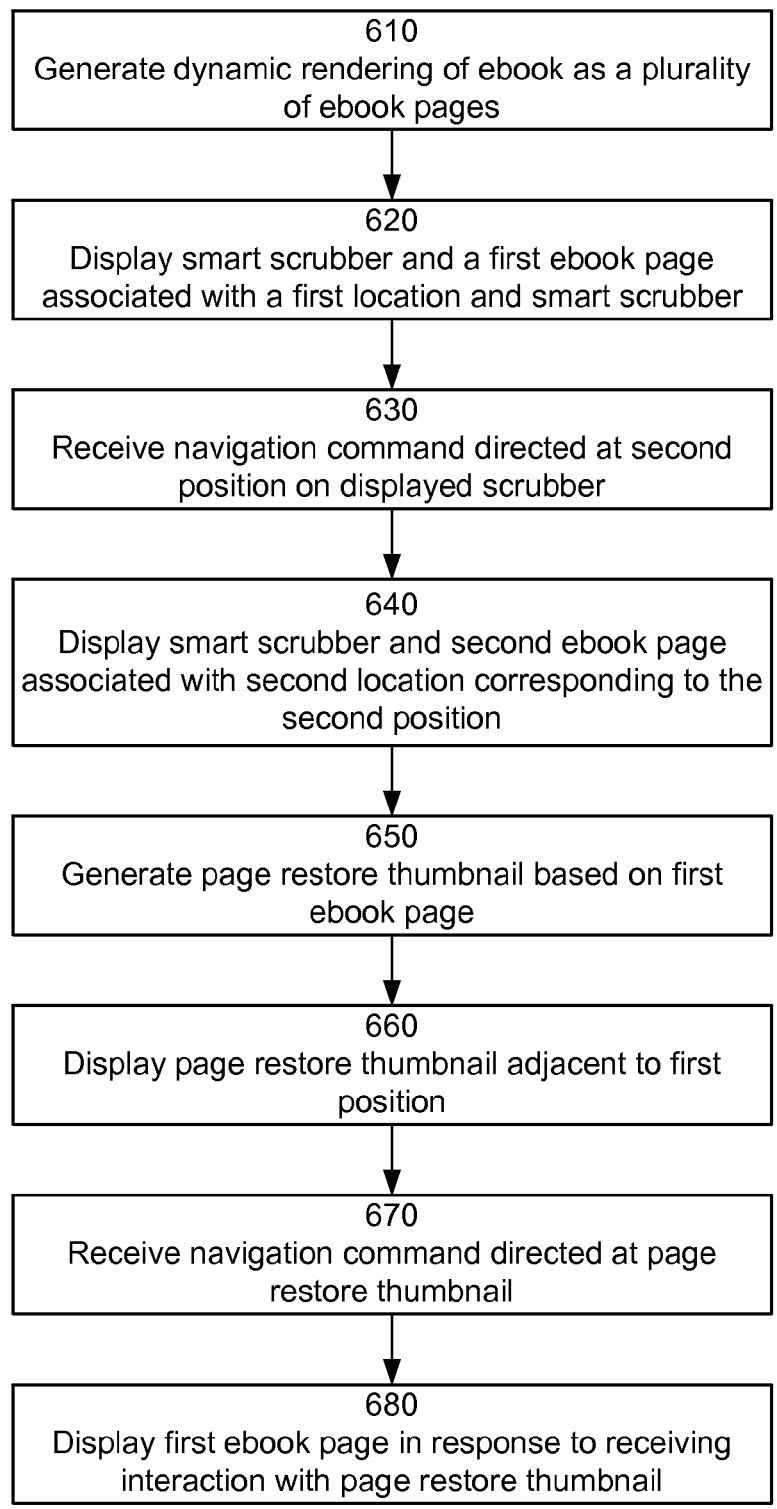
FIG. 6 is a flowchart illustrating a process of navigating within an ebook using a smart scrubber according to an embodiment.

FIG. 6 is a flowchart illustrating a process of navigating within an ebook using a smart scrubber according to an embodiment. Other entities may perform some or all of the steps of the process in other embodiments. Likewise, embodiments may include different and/or additional steps, or perform the steps in different orders.

The user device 100 generates 610 (e.g., using the parsing module 410) a dynamic rendering of the ebook as a plurality of ebook pages.

The user device 100 displays 620 (e.g., using the navigation interface module 460) a smart scrubber and a first ebook page associated with a first location in the ebook. The smart scrubber may include a location indicator at a first position corresponding to the first location.

The user device 100 receives 630 (e.g., using the command detection module 420) a navigation command directed at a second position on the displayed scrubber. For example, the navigation command is received after displaying the smart scrubber and the first ebook page. For example, the navigation command is a swiping gesture or a tapping gesture toward the second position. As another example, the navigation command is a tapping gesture on a contextual icon at the second position.

In response to the received navigation command, the user device 100 displays 640 (e.g., using the navigation interface module 460) the smart scrubber and a second ebook page at a second location corresponding to the second position. If the smart scrubber includes a location indicator, the user device 100 displays the location indicator at the second position.

The user device 100 generates 650 (e.g., using the thumbnail generation module 430, using the icon generation module 450) a page restore thumbnail based on the first ebook page. For example, the page restore thumbnail incorporates a miniaturized image of the first ebook page as it is rendered in a reading mode. The user device 100 displays 660 (e.g., using the navigation interface module 460) the page restore thumbnail adjacent to the first position on the smart scrubber. For example, if the smart scrubber is a horizontal bar, the page restore thumbnail is displayed in horizontal alignment with the first position on the smart scrubber.

After displaying the page restore thumbnail, the user device 100 receives 670 (e.g., using the command detection module 420) a navigation command directed at the page restore thumbnail. For example, the navigation command is a tapping gesture on the page restore thumbnail. In response to the navigation command directed at the page restore thumbnail, the user device 100 displays 680 (e.g., using the navigation interface module 460) the first ebook page. If the scrubber bar includes a location indicator, then user device 100 displays the location indicator at the first location on the scrubber bar.

Computer

Figure 7:
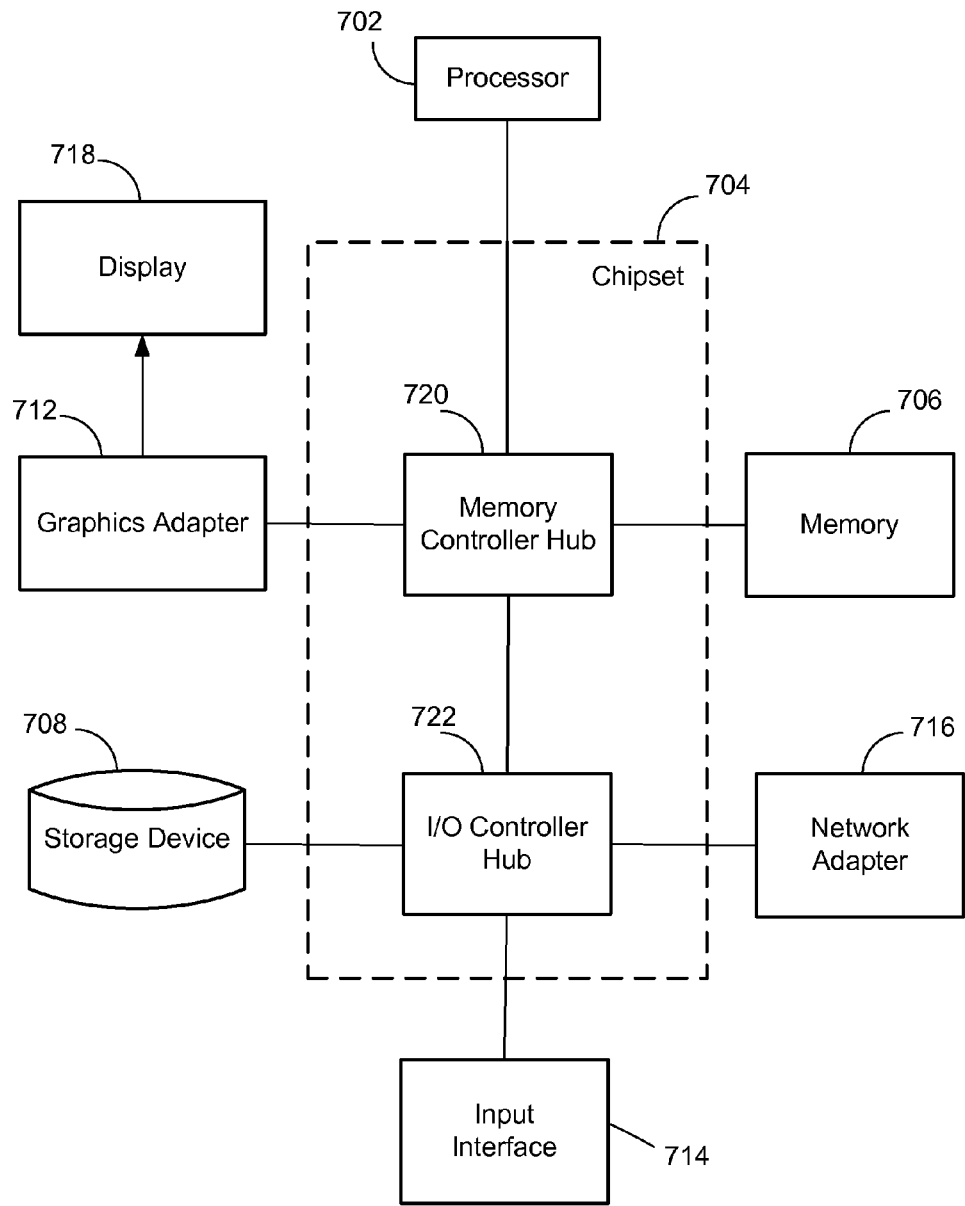
FIG. 7 is a high-level block diagram illustrating an example computer for implementing the entities shown in FIG. 1.

FIG. 7 is a high-level block diagram illustrating an example computer 700 for implementing the entities shown in FIG. 1. The computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, an input interface 714, and network adapter 716 are coupled to the I/O controller hub 722. Other embodiments of the computer 700 have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The input interface 714 is a touch-screen interface, a mouse, track ball, or other type of pointing device, a keyboard, or some combination thereof, and is used to input data into the computer 700. In some embodiments, the computer 700 may be configured to receive input (e.g., commands) from the input interface 714 via gestures from the user. The graphics adapter 712 displays images and other information (e.g., the reading interface 200 or the navigation interface 300) on the display 718. The network adapter 716 couples the computer 700 to one or more computer networks. In one embodiment, the display 718 and input interface 714 are combined as a touch-sensitive display (e.g., a touch screen), which detects gestures (e.g., scrolling, tapping, swiping, pinching, stretching).

The computer 700 is adapted to execute computer program modules for providing functionality described herein. As used herein, the term "module" refers to computer program logic used to provide the specified functionality. Thus, a module can be implemented in hardware, firmware, software, and/or a combination thereof. In one embodiment, program modules (e.g., the e-reader module 140, the navigation module 150) are stored on the storage device 708, loaded into the memory 706, and executed by the processor 702.

The types of computers 700 used to implement the entities of FIG. 1 can vary depending upon the embodiment and the processing power required by the entity. For example, the user device 100 is a computer 700 such as a smart phone or a tablet. As another example, the media source 120 is one or more servers working together to provide the functionality described herein. A computer 700 (e.g., a server) may lack some of the components described above, such as a keyboard, a graphics adapter 712, and a display 718.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating graphical user interfaces for navigation interfaces that facilitate navigation of ebooks. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method for generating a navigation interface that facilitates navigation of an ebook on a device having a display, the method comprising:
   identifying respective contextual information associated with each location from a plurality of different locations in the ebook, each location from the plurality of different locations being associated with a particular ebook page of a plurality of ebook pages of the ebook;
   representing the respective contextual information associated with each location from the plurality of different locations with a respective contextual icon;
   ranking the respective contextual information associated with the plurality of different locations according to selection criteria;
   determining, based on the respective contextual information associated with each location from the plurality of different locations, respective display positions of the respective type of contextual icons that represent the respective contextual information associated with each location from the plurality of different locations, wherein the respective display position of each of the respective type of contextual icons is:
      on a scrubber that represents a range of the plurality of ebook pages; and
      determined to be either above or below the scrubber depending on the respective contextual information that is represented by that respective type of contextual icon;
   determining, based on the respective display positions and available display space on the display of the device, whether any two or more of the display positions conflict;
   selecting a subset of the respective contextual information associated with each location from the plurality of different locations responsive to ranking the respective contextual information associated with each location from the plurality of different locations according to selection criteria and further responsive to determining whether any two or more of the display positions conflict;
   generating the scrubber as having the respective contextual icons associated with the subset of the respective contextual information associated with each location from the plurality of different locations; and
   displaying the scrubber on the display of the device.

2. The method of claim 1, further comprising:
   receiving a navigation command directed at a particular contextual icon displayed on the scrubber; and
   responsive to receiving the navigation command, displaying a page of the ebook associated with the particular contextual icon.

3. The method of claim 1, wherein ranking the respective contextual information associated with each location from the plurality of different locations according to selection criteria comprises:
   identifying, from the respective contextual information associated with each location from the plurality of different locations, eligible contextual information and ineligible contextual information by applying filtering criteria to the respective contextual information associated with each location from the plurality of different locations;
   removing the ineligible contextual information; and
   determining a ranking of the eligible contextual information according to the selection criteria.

4. The method of claim 1, wherein selecting the subset of the respective contextual information associated with each location from the plurality of different locations further comprises:
   determining a social context in which the ebook is presented;
   determining whether the respective contextual information associated with each location from the plurality of different locations is relevant to the social context; and
   selecting the subset of the respective contextual information associated with each location from the plurality of different locations responsive to determining that at least a portion of the respective contextual information associated with each location from the plurality of different locations is relevant to the social context.

5. The method of claim 1, wherein representing the respective contextual information associated with each location from the plurality of different locations with respective contextual icons comprises:

selecting a type of contextual icon based on a type of the respective contextual information associated with a particular location from the plurality of different locations; and generating the respective contextual icon that represents the respective contextual information associated with the particular location as having a visual appearance determined responsive to the selected type of contextual icon.

6. The method of claim 5, wherein generating the respective contextual icon that represents the respective contextual information associated with the particular location comprises:

identifying a user associated with the type of contextual information; and incorporating an item associated with the identified user into the visual appearance of the respective contextual icon.

7. The method of claim 5, wherein generating the respective contextual icon that represents the respective contextual information associated with each location from the particular location comprises:

obtaining ebook content from an ebook page associated with the respective contextual icon; and incorporating the ebook content into the visual appearance of the respective contextual icon.

8. A non-transitory computer-readable storage medium storing executable instructions for generating a navigation interface that facilitates navigation of an ebook on a device having a display, the instructions executable by a processor to perform steps comprising:

identifying respective contextual information associated with each location from a plurality of different locations in the ebook, each location from the plurality of different locations being associated with a particular ebook page of a plurality of ebook pages of the ebook;

representing the respective contextual information associated with each location from the plurality of different locations with a respective type of contextual icon;

ranking the respective contextual information associated with the plurality of different locations according to selection criteria;

determining, based on the respective contextual information associated with each location from the plurality of different locations, respective display positions of the respective type of contextual icons that represent the respective contextual information associated with each location from the plurality of different locations, wherein the respective display position of each of the respective contextual icons is:

on a scrubber that represents a range of the plurality of ebook pages; and determined to be either above or below the scrubber depending on the respective contextual information that is represented by that respective type of contextual icon;

determining, based on the respective display positions and available display space on the display of the device, whether any two or more of the display positions conflict;

selecting a subset of the respective contextual information associated with each location from the plurality of different locations responsive to ranking the respective contextual information associated with each location from the plurality of different locations according to selection criteria further responsive to determining whether any two or more of the display positions conflict;

generating the scrubber as having the respective contextual icons associated with the subset of the respective contextual information associated with each location from the plurality of different locations; and displaying the scrubber on the display of the device.

9. The computer-readable storage medium of claim 8, wherein ranking the respective contextual information associated with each location from the plurality of different locations according to selection criteria comprises:

identifying, from the respective contextual information associated with each location from the plurality of different locations, eligible contextual information and ineligible contextual information by applying filtering criteria to the respective contextual information associated with each location from the plurality of different locations;

removing the ineligible contextual information; and determining a ranking of the eligible contextual information according to the selection criteria.

10. The computer-readable storage medium of claim 8, wherein representing the respective contextual information associated with each location from the plurality of different locations with respective contextual icons comprises:

selecting a type of contextual icon based on a type of the respective contextual information associated with a particular location from the plurality of different locations; and generating the respective contextual icon that represents the respective contextual information associated with the particular location as having a visual appearance determined responsive to the selected type of contextual icon.

11. A device for generating a navigation interface that facilitates navigation of an ebook, the device comprising:

a display;

a memory storing executable instructions;

a processor adapted to execute the executable instructions to perform steps comprising:

identifying respective contextual information associated with each location from a plurality of different locations in the ebook, each location from the plurality of different locations being associated with a particular ebook page of a plurality of ebook pages of the ebook;

representing the respective contextual information associated with each location from the plurality of different locations with a respective type of contextual icon;

ranking the respective contextual information associated with the plurality of different locations according to selection criteria;

determining, based on the respective contextual information associated with each location from the plurality of different locations, respective display positions of respective type of contextual icon that represent the respective contextual information associated with each location from the plurality of different locations, wherein the respective display position of each of the respective contextual icons is:

on a scrubber that represents a range of the plurality of ebook pages; and determined to be either above or below the scrubber depending on the respective contextual information that is represented by that respective type of contextual icon;

determining, based on the respective display positions and available display space on the display of the device, whether any two or more of the display positions conflict;

selecting a subset of the respective contextual information associated with each location from the plurality of different locations responsive to ranking the respective contextual information associated with each location from the plurality of different locations according to selection criteria further responsive to determining whether any two or more of the display positions conflict;

generating the scrubber as having the respective contextual icons associated with the subset of the respective contextual information associated with each location from the plurality of different locations; and displaying the scrubber on the display.

12. The device of claim 11, wherein ranking the respective contextual information associated with each location from the plurality of different locations according to selection criteria comprises:

identifying, from the respective contextual information associated with each location from the plurality of different locations, eligible contextual information and ineligible contextual information by applying filtering criteria to the respective contextual information associated with each location from the plurality of different locations;

removing the ineligible contextual information; and determining a ranking of the eligible contextual information according to the selection criteria.

13. The device of claim 11, wherein representing the respective contextual information associated with each location from the plurality of different locations with respective contextual icons comprises:

selecting a type of contextual icon based on a type of the respective contextual information associated with a particular location from the plurality of different locations; and generating the respective contextual icon that represents the respective contextual information associated with the particular location as having a visual appearance determined responsive to the selected type of contextual icon.

14. The method of claim 1, wherein ranking the respective contextual information associated with each location from the plurality of different locations according to selection criteria comprises:

ranking the respective contextual information associated with each location from the plurality of different locations based on a type of memory in which respective contextual information is stored.

* * * * *

UNITED STATES PATENT AND TRADEMARK OFFICE
CERTIFICATE OF CORRECTION

PATENT NO. : 9,939,996 B2
APPLICATION NO. : 14/459193
DATED : April 10, 2018
INVENTOR(S) : Adeline Lee Beavers et al.

Page 1 of 1

It is certified that error appears in the above-identified patent and that said Letters Patent is hereby corrected as shown below:

In the Claims

Column 22, Line 1, (Claim 8): Replace "selection criteria further responsive" to --selection criteria and further responsive--

Signed and Sealed this
Seventh Day of May, 2019

Andrei Iancu
*Director of the United States Patent and Trademark Office*